United States Patent [19]
Coleman et al.

[11] Patent Number: 5,582,734
[45] Date of Patent: Dec. 10, 1996

[54] OXIDATION DITCH MODIFICATION AND AUTOMATED CONTROL SYSTEM FOR NITROGEN REMOVAL AND SLUDGE SETTLING IMPROVEMENTS

[75] Inventors: Thomas E. Coleman, Yakima; W. Brent Denham, Naches; Darrel S. Fleischman, Elmer City, all of Wash.; H. David Stensel, 8521 E. Mercer Way, Mercer Island, Wash. 98040

[73] Assignee: H. David Stensel, Mercer Island, Wash.

[21] Appl. No.: 123,160

[22] Filed: Sep. 14, 1993

[51] Int. Cl.$^6$ .................................................. C02F 3/30
[52] U.S. Cl. ......................... 210/614; 210/629; 210/630; 210/903
[58] Field of Search ................................... 210/614, 624, 210/629, 630, 903

[56] References Cited

U.S. PATENT DOCUMENTS

| | | | |
|---|---|---|---|
| 2,875,151 | 2/1959 | Davidson | 210/4 |
| 4,056,465 | 11/1977 | Spector | 210/7 |
| 4,162,153 | 7/1979 | Spector | 71/12 |
| 4,285,818 | 8/1981 | Muskat | 210/629 |
| 4,460,471 | 7/1984 | Reid | 210/629 |
| 4,663,044 | 5/1987 | Goronszy | 210/624 |
| 4,975,197 | 12/1990 | Wittmann et al. | 210/629 |

OTHER PUBLICATIONS

G. Tchobanoglous and F. L. Burton, Revisers. Wastewater Engineering—Treatment, Disposal and Reuse. Metcalf & Eddy, Inc.. 1991. pp. 541–545.

C. W. Randall, J. L. Barnard and H. D. Stensel. Design and Retrofit of Wastewater Treatment Plants for Biological Nutrient Removal. Water Quality Management Library, Technomic Publishing Co., Inc.. 1992. pp. 146–152.

Joint Task Force of the Water Environment Federation and the American Society of Civil Engineers. Design of Municipal Wastewater Treatment Plants. 1992. pp. 927–934.

D. Jenkins, M. G. Richard and G. T. Daigger. Manual on the Causes and Control of Activated Sludge Bulking and Foaming. Water Research Commission, Republic of South Africa. 1984. pp. 70–75.

O. E. Albertson. The Control of Bulking Sludges: From the Early Innovators to Current Practice. Journal Water Pollution Control Federation. Apr. 1987. pp. 172–182.

C. C. Peddie, D. S. Mavinic and C. J. Jenkins. Use of ORP for Monitoring and Control of Aerobic Sludge Digestion. Journal of Environmental Engineering. May/Jun. 1990. pp. 461–471.

D. G. Wareham, K. J. Hall and D. S. Mavinic. Real–Time Control of Aerobic–Anoxic Sludge Digestion Using ORP. Journal of Environmental Engineering. Jan./Feb. 1993. pp. 120–136.

J. Charpentier, H. Godart, G. Martin and Y. Mogno. Oxidation–Reduction Potential (ORP) Regulation as a Way to Optimize Aeration and C, N and P Removal: Experimental Basis and Various Full–Scale Examples. Water Science Technology (Great Britain). 1989. pp. 1209–1223.

*Primary Examiner*—Thomas G. Wyse
*Attorney, Agent, or Firm*—Roy, Kiesel & Tucker

[57] ABSTRACT

A method for treating municipal wastewater in an oxidation ditch activated sludge system by automated determination of the nitrogen depletion inflection point, which enables anoxic cycles to be utilized to achieve improved settling of the activated sludge by providing selective pressure against the growth of filamentous bacteria, by providing improved total nitrogen removal, by providing energy savings and by providing recovery of alkalinity.

6 Claims, 6 Drawing Sheets

FIGURE 2

TYPICAL GRAPH OF ORP VS TIME
FOR TRANSITIONS THROUGH AEROBIC, ANOXIC
AND ANAEROBIC CONDITIONS

A  ANOXIC START TIME
B  ANOXIC TIME
C  NITRATE KNEE DETECTION LAG TIME
D  AMIONIA DEPLETION TIME (DO INFLECTION)
E  TIME TO NEXT ANOXIC CYCLE

FIGURE 3
SCHEMATIC OF FLOW AND LOADING CHANGES

PROGRAM LOGIC EXAMPLE 1

FIGURE 4

PROGRAM LOGIC EXAMPLE 2
FIGURE 5

PROGRAM LOGIC EXAMPLE 3

FIGURE 6

OXIDATION DITCH MODIFICATION AND AUTOMATED CONTROL SYSTEM FOR NITROGEN REMOVAL AND SLUDGE SETTLING IMPROVEMENTS

BACKGROUND OF THE INVENTION

1. Field of the Invention.

This invention is applicable to the treatment of municipal wastewater by the activated sludge process. It is particularly applicable to oxidation ditch activated sludge treatment systems which utilize a "race track" basin configuration. The invention can be incorporated into existing or new oxidation ditch systems to achieve improved settling of the activated sludge by providing selective pressure against the growth of filamentous bacteria, improved total nitrogen removal, energy savings, and recovery of alkalinity.

2. Description of Related Art.

a) Oxidation Ditch Activated Sludge Treatment Systems. The activated sludge process has been used for many years for the removal of biochemical oxygen demand (BOD) from municipal wastewaters. The process consists of an aeration basin containing a suspension of microorganisms referred to as mixed liquor. Wastewater is fed to the aeration basin and oxygen is utilized by the biomass to sorb, assimilate and metabolize the BOD available in the wastewater. From the aeration basin mixed liquor flows to a clarifier where the biomass settles and treated wastewater overflows. Most of the settled biomass is returned to the aeration basin. A smaller portion is wasted in order to maintain a relatively constant level of biomass in the system. The activated sludge process has been extensively described in the literature and in textbooks. Se Metcalf & Eddy.

Oxidation ditch activated sludge systems offer cost-effective wastewater treatment for small municipalities, and hundreds of such plants exist in the United States today. The process is characterized by an aeration basin that has an oval or racetrack configuration with unidirectional channel flow at sufficient velocity to maintain suspension and mixing of the biological solids or mixed liquor suspended solids (MLSS). Various types of mechanical equipment have been used in oxidation ditches to provide mixing and aeration. The most commonly used aeration systems are the brush rotor aerator which rotates partially submerged across the width of the channel, and the low speed surface aerator specifically located at the end of the dividing wall, as in the Carrousel system..

Other unique features of an oxidation ditch that distinguish it from conventional activated sludge treatment are:

1) a long solids retention time and hydraulic detention time of about 30 days and 24 hours, respectively;

2) a simplified plant flowsheet lacking primary clarification and anaerobic digestion; and 3) uses conservatively designed secondary clarifier loadings. These features result in a system that is easy to operate, provides a high quality effluent in terms of BOD and suspended solids, can handle variable loads well, and is economical for moderate and small size plants.

b. Nitrogen Removal in Oxidation Ditch Systems. Nitrogen removal in oxidation ditch systems is a function of the system design, plant loading, operational method, and aerator control method. Nitrogen removal efficiencies range from 60% to 95%, with aeration control and operational methods having a significant influence on performance (Randall et al., 1992). A description of oxidation ditch designs to accomplish nitrogen removal is provided in a recent Manual of Practice publication by the Water Environment federation (WEF, 1992). The manual points out that these channel flow systems may be operated to enhance nitrogen removal by carefully controlling dissolved oxygen (DO) levels in the basin. As the channel flow leaves the aeration zone in the oxidation ditch, the dissolved oxygen (DO) concentration decreases until it is depleted, and anoxic zones occur in the ditch where nitrate is used instead of DO to accomplish nitrogen removal. The location and size of these anoxic zones will vary with time due to diurnal loading changes, and will also depend on the average plant loading and design conditions. Consistent nitrogen removal by this method requires a comprehensive DO control system that includes channel DO measurements and a means to vary the aerator energy output. The latter is done by using two-speed motors, variable speed motors or variable level weirs. Under low loading conditions, it is very difficult, if not impossible, to accomplish nitrogen removal by this method since, for most designs, some aeration is needed to maintain channel flow. Variable nitrogen removal levels are obtained and vigilant control is needed to maximize performance. Nitrate consumption with this method is driven by the endogenous respiration rate of the channel mixed liquor, and not by the consumption of the influent BOD.

Another approach described requires the use of multiple oxidation ditches with a piping design that allows alternating the influent feed to the ditches, operation of the ditches in series, and alternating the effluent withdrawal from either of the ditches. This is referred to as the phased isolation ditch treatment or the Bio-denitro process. The ditches use internal mixers so that the aerators can be turned off, and the ditch can be operated as an anoxic tank during part of the operation. The following table summarizes a typical sequence. First the feed is directed to ditch 1 and the effluent leaves from ditch 2, and then these are switched. In the final two phases, the influent and effluent only travels through one of the two ditches under aerobic conditions to accumulate nitrate for use in the later anoxic operations.

TABLE 1

EXAMPLE OF PHASED ISOLATION DITCH OPERATING SEQUENCE

| Feed | Ditch 1 | Ditch 2 | Effluent |
| --- | --- | --- | --- |
| Ditch 1 | Anoxic | Aerobic | Ditch 2 |
| Ditch 2 | Aerobic | Anoxic | Ditch 1 |
| Ditch 2 | Aerobic | Aerobic | Ditch 2 |
| Ditch 1 | Aerobic | Aerobic | Ditch 1 |

Significant operator attention is required to determine when to alternate the feed point and ditch operating sequence and conditions. The operating sequence may not always be obvious to many plant operators. These systems have been used in Denmark, but have not been popular in the United States.

A third approach used to accomplish nitrogen removal with oxidation ditches is to build an external anoxic tank ahead of the oxidation ditch for contacting the influent wastewater with nitrate containing mixed liquor pumped forward from the oxidation ditch. This method provides consistent reliable nitrogen removal with its efficiency generally being a function of the mixed liquor pumping rate. However, the system requires a greater capital expenditure for the external anoxic tank and pumping system, as well as related energy costs for pumping and mixing in the anoxic tank. Such designs have been proposed in Florida to meet a 70% to 80% nitrogen removal level.

c) Bulking Sludge Control. Oxidation ditch systems generally develop poor settling sludge as indicated by high sludge volume index (SVI) values. The SVI is the volume in mL occupied by one gram of sludge after 30 minutes of settling of a 1.0 or 2.0 liter mixed liquor sample. The high SVI values are usually associated with significant levels of filamentous bacteria within the activated sludge floc. Oxidation ditch systems are operated with low organic loadings, and Jenkins et al. (984) have attributed such operating conditions to the development of a filamentous bacteria population. Filamentous bacteria have greater ability to scavenge organic substrates or oxygen, and thus they have an advantage in low loaded systems where substrate concentrations are minimal.

Albertson (1987) has reviewed developments that have led to design and operating strategies that can select against the development of filamentous bacteria. These conditions allow the non-filamentous bacteria to capture a large proportion of the incoming BOD, so that the non-filamentous bacteria grow instead of filamentous organisms. One such method is to establish anoxic conditions during the initial contact between the influent wastewater and the mixed liquor. Filamentous bacteria are ineffective in using nitrate for oxidation of the incoming BOD as compared to non-filamentous bacteria, and thus do not proliferate under such conditions. The commonly accepted method places an anoxic tank ahead of the aeration tank, with a high mixed liquor recycle rate from the aeration basin to the anoxic basin. This method was successfully demonstrated by Heide and Pasveer (1974) (See Robertson, p. 176) for control of SVI in an oxidation ditch. An SVI of 70 mL/g was achieved compared to an SVI of 500 mL/g when the influent wastewater was fed directly to the oxidation ditch. The disadvantages of this system were described above per its use for nitrogen removal.

d) Oxidation-Reduction Potential Control Methods. Oxygen-Reduction Potential (ORP) is a measurement of the ratio of oxidants to reductants in a system. For biological systems, ORP values are lower and become negative as oxygen is removed and nitrate is consumed. Peddie et al. (1990) showed that the change in ORP versus time could be used to determine when oxygen and nitrate were depleted after stopping aeration during operation of an aerobic sludge digester. During depletion of oxygen or nitrate, distinct changes in the slope of ORP versus time are observed. Wareham et al. (1993) showed that nitrogen removal could be improved during operation of a bench-scale aerobic digester with ORP control versus the use of a timer to turn the digester aeration on and off.

Charpentier et al. (1988) described the use of ORP control to regulate aeration of an oxidation ditch. They would decrease the aeration level if the ORP increased too much to indicate the formation of nitrate. In this way they could save energy by preventing the use of oxygen for the oxidation of ammonia. Thus, the purpose of employing ORP in this case was to prevent the formation of nitrate, and was not related to nitrogen removal.

e) Relevance of Prior Experience to the Process of This Invention. The only nitrogen removal scheme that also changes the ditch operation from aerobic to anoxic is the phased isolation ditch method. However, this method lacks a feedback control method as we disclose herein to determine the length of the anoxic period under varying conditions. The anoxic time could exceed the time needed for full nitrate depletion, for example. This method also requires multiple tanks and more complex piping and valves, whereas the method disclosed herein can be applied to a single tank oxidation ditch.

The related art that teaches the use of anoxic conditions for SVI control requires an external anoxic tank in contrast to our anoxic/aerobic operating cycles within the single ditch.

The related art on ORP control does illustrate the ability to interpret the ORP data to determine when nitrate is depleted in an aerobic digester. However, there is no relationship between this and our system disclosed herein to use the ORP probe with DO control for nitrogen removal and SVI control in treating wastewater in an oxidation ditch.

SUMMARY OF THE INVENTION

Our invention comprises a process that provides SVI control, high levels of nitrogen removal, energy savings and alkalinity recovery, under variable wastewater loading conditions by modifying the design and operation of the conventional continuous flow oxidation ditch system. The process incorporates a mixer in the oxidation ditch which enables independent aeration and mixing, together with an operation and control strategy which maximizes the assimilation of influent BOD under anoxic conditions. The addition of the mixer allows the ditch to be mixed with the aeration off, thereby making the entire ditch anoxic when the mixer is on and the aeration is off.

The control of the anoxic and aerobic cycle frequency and duration during a given 24-hour period must be done in a manner which maximizes the assimilation of BOD under anoxic conditions as stated above. This control can be done with simple timers together with detailed information on the diurnal loading variations, or with an automatic microprocessor-based control system using on-line ORP, dissolved oxygen (DO) and/or influent flow rates as process variable inputs.

DETAILED DESCRIPTION OF THE PROCESS

Figure 1:
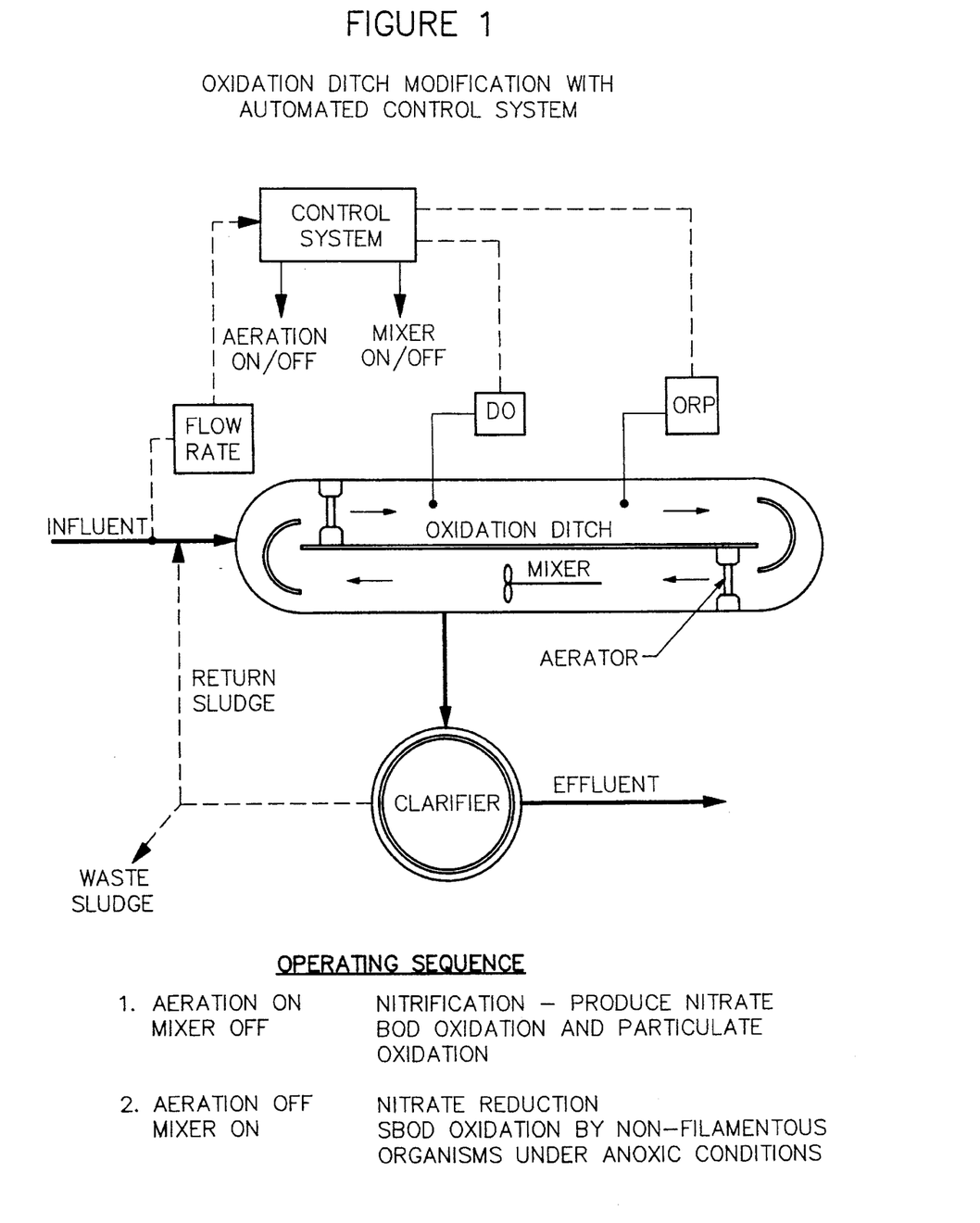
FIG. 1 is a schematic and diagrammatic view of the oxidation ditch modification with automated control enabling anoxic/aerobic cycling within an oxidation ditch to maximize assimilation of BOD under anoxic conditions.

FIG. 1 shows a schematic of the modified oxidation ditch activated sludge system which incorporates a mixer in a continuous flow ditch which can operate independently of the aeration system. This enables the entire ditch to cycle between aerobic and anoxic conditions, and this capability, when used in conjunction with a control strategy which maximizes the assimilation of influent BOD under anoxic conditions, results in improved SVI control, improved total nitrogen removal, energy savings and alkalinity recovery. In this invention, during an anoxic cycle, nitrate, which has been produced in the system through the biological oxidation of ammonia, is used as the electron acceptor instead of oxygen. The implementation of this control strategy to achieve these objectives involves the control of the time, duration and frequency of the anoxic periods.

The most basic control strategy would utilize simple program timers to turn the aerators and the mixer(s) on and off at preselected times. These times would be selected based on knowledge of the diurnal loading variations for a specific treatment plant along with the site specific treatment requirements.

However, the process is further enhanced by utilizing an automated control system which would use on-line ORP, DO and flow rate inputs to a microprocessor which would determine the optimal time, duration and frequency of the anoxic cycles. The automated control system would provide improved performance, and would be easier to operate than the basic control strategy utilizing simple program timers. The automated control system would not require detailed information on the diurnal loading characteristics, and could better adjust the process to varying loading conditions.

Implementation of the automated control system requires that ORP and DO probes be installed in the oxidation ditch for continuous on-line measurement. Probes installed in this environment are subject to fouling with rags which would make their readings and the automated control system unreliable.

We have also developed a method for the installation of the probes in the ditch to prevent fouling so that continuous measurements are possible. This involves placing the probe in an inverted cone, and thus protecting it from accumulation of rags and other material in the mixed liquor that could attach to the probes. This device is uniquely applicable to channel systems where the flow velocity is unidirectional.

Though FIG. 1 shows the system with rotor aerators and an external clarifier, the control system can be applied to any oxidation system aeration design, including surface aerators (Carousel design), submerged turbine aerators, jet aeration and diffused aeration, as well as oxidation ditch systems that use intrachannel clarifiers.

As stated previously, the main objective of the aeration control strategy is to maximize the amount of influent BOD assimilated using nitrate in the absence of oxygen (anoxic conditions). The implementation of this automated process to achieve this objective involves the control of the time, duration and frequency of the anoxic periods.

Figure 2:
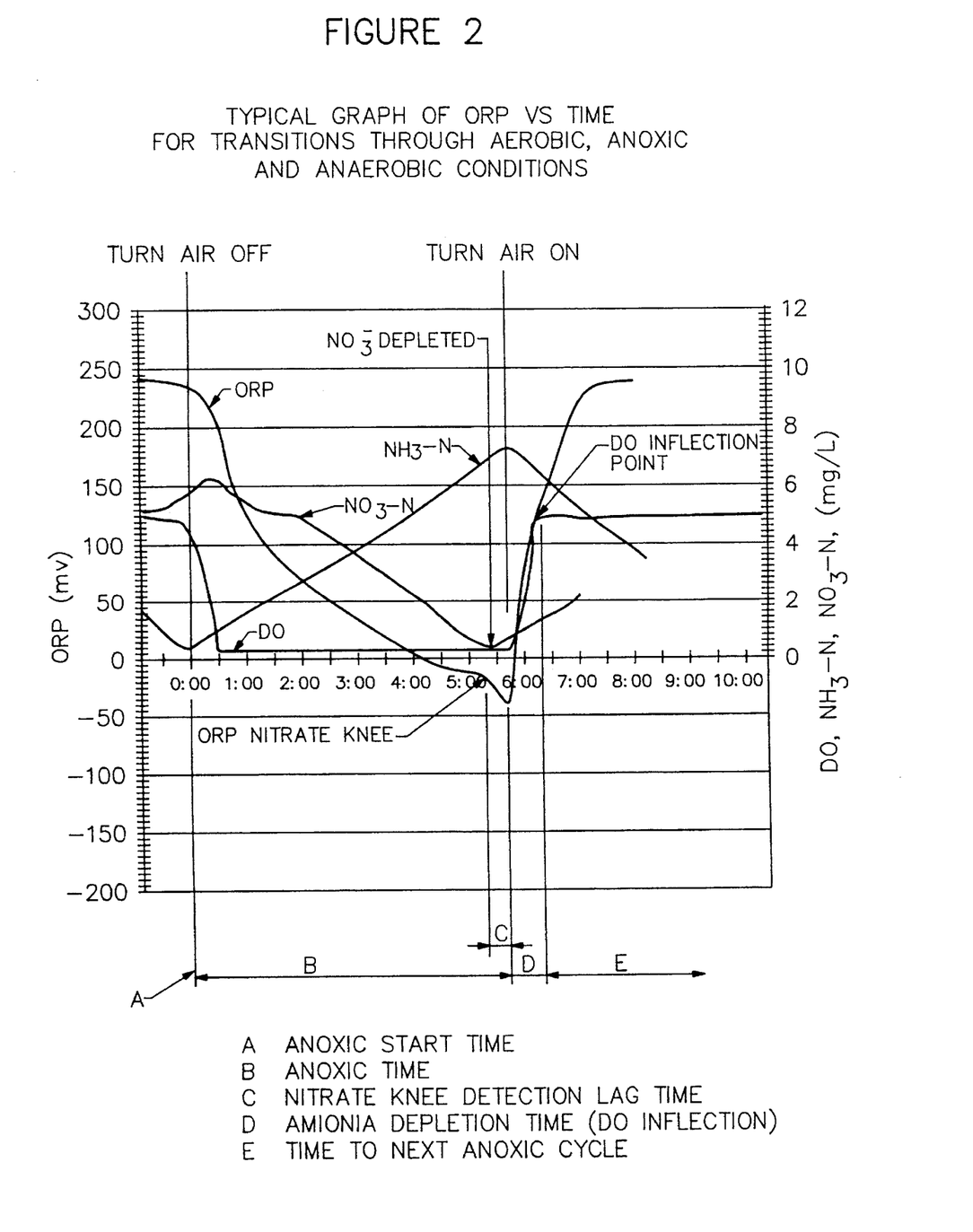
FIG. 2 is a typical graph of ORP vs. Time, showing the relationship of the ORP value to DO, $NO_3$, $NH_3$ concentrations in the system.

In order to achieve the process objective, it is necessary to maximize the conversion of available ammonia to nitrate, and to schedule the anoxic periods so that this nitrate can be utilized for the assimilation of influent BOD. Furthermore, an anoxic period, once initiated, should continue until the available nitrate is depleted. We have observed that a plot of ORP mv output versus time in a full-scale continuous flow oxidation ditch system undergoes a characteristic inflection point as the nitrate concentration approaches zero. This is illustrated in FIG. 2 which plots the real time relationship of ORP, nitrate and ammonia in the treatment system. A microprocessor-based control system can determine the inflection point mathematically, and use it as a control output to terminate the anoxic period and begin aeration.

We have developed a set of computer program instructions which can reliably detect the nitrate depletion ORP inflection point in an oxidation ditch aeration basin. This inflection point is found by first performing least squares linear regression on two series of data points. The first line is fit to the most recent series of points and is termed the current slope. The length of the series used to calculate the current slope can be adjusted by the plant operator, but would normally include data points for a 5-minute period. The second series immediately precedes the first series, and the least squares linear regression fit is termed the trailing slope. The second series length is also adjustable, but would normally be about 15 minutes. The current slope and the trailing slope are continually recalculated as additional data points are logged by the computer.

With each calculation, the current slope is subtracted from the trailing slope. This difference is then compared to a preset detection increment, or "tolerance". If both lines have negative slope, and the change in slope is greater than the detection tolerance, the nitrate depletion inflection point is indicated. The detection tolerance needs to be adjusted for a specific system so that it is small enough to insure detection of the nitrate depletion point, but large enough to avoid false indications resulting from system "noise" or other short term anomalies in the data.

The nitrate depletion detection program has been run on data logged at a 0.3 MGD oxidation ditch plant, and found to be very reliable in indicating the correct inflection point.

A copy of the BASIC language software program code for this application is attached to this specification.

In implementing the control strategy to maximize nitrate utilization for influent BOD assimilation, the total anoxic mixing time is limited by the nitrate available. This is, in turn, a function of the influent ammonia and organic nitrogen which is available for oxidation to nitrate. For a given treatment system, therefore, the total time available for anoxic treatment will be relatively constant. The utilization of the available anoxic treatment time can be accomplished in one long anoxic cycle or in a series of multiple shorter anoxic cycles, each followed by a period of aeration.

Figure 3:
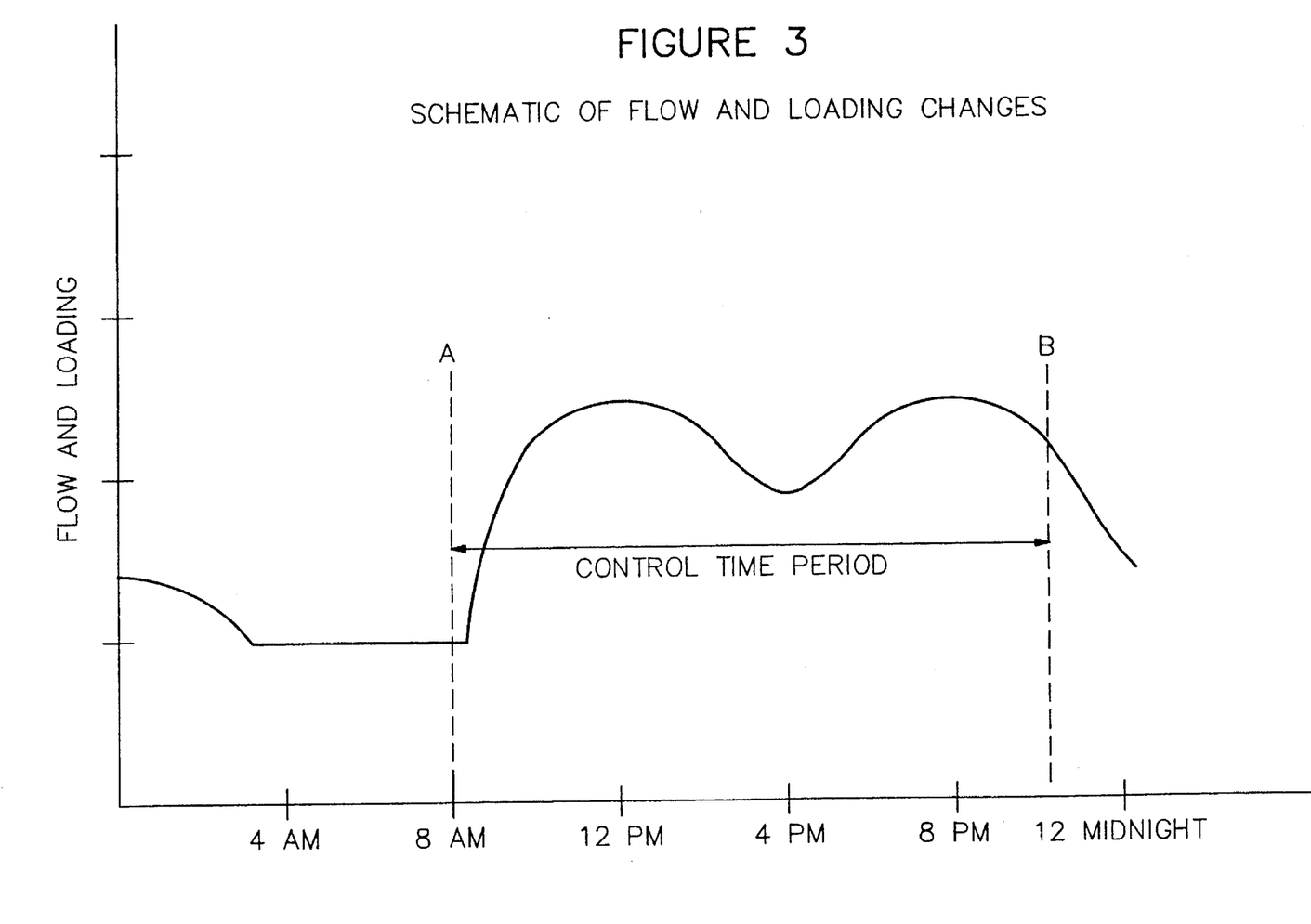
FIG. 3 is a typical diurnal loading curve for a small to medium-sized municipal wastewater treatment plant.

Another observation which is key to implementing an automatic control strategy is the diurnal variation which is characteristic of small and medium size wastewater treatment plant influent loadings. The pattern may vary somewhat from one plant to another, but is usually very consistent from day to day for an individual plant. A typical diurnal loading curve is shown in FIG. 3. For the typical plant, the highest hydraulic and organic loadings occur in the morning hours. Loading remains relatively high through the daytime hours, with another peak occurring in the early evening. Both flow and BOD loading drop off dramatically in the late night and early morning hours. The control strategy and process control system, therefore, should schedule any anoxic period or periods during the time between Point A and Point B when most of the influent BOD is available. The period is designated as the anoxic/aerobic cycle period in FIG. 3.

We have observed in a full-scale continuous flow oxidation ditch system that one long anoxic cycle beginning during the morning as loading begins to increase, and continuing until the nitrate depletion is complete (typically 6 to 8 hours) provides excellent SVI control. This strategy was employed at a 0.3 million gallon per day oxidation ditch plant, and the SVI's were reduced to 120 ml/g from the range of 220 to 240 ml/g, which was typical for this plant. This suggests that the one long anoxic cycle provides a stronger selective pressure against the growth of filamentous bacteria. Total nitrogen removal was good using this control strategy (i.e., one long anoxic cycle) averaging over 80% removal.

An alternative control strategy using two four-hour anoxic periods, each followed by two hours of aeration did not show any improvement in SVI control, but resulted in excellent total nitrogen removal, consistently over 90%.

Effluent composite nitrate and ammonia concentrations for the 0.3 MGD oxidation ditch plant under these two different anoxic/aerobic cycle strategies are shown in Table 2 below.

TABLE 2

| Operating Mode | Average Effluent Concentration, mg/L | | |
|---|---|---|---|
| | $NO_3 - N$ | $NH_4 - N$ | $NO_3 + NH_4$ as N |
| 4 2-hour Anox/Aer cycles 1 Anox/Aer cycle | 1.20 | 0.53 | 1.73 |
| 5-hr Anoxic | 7.80 | 1.10 | 8.90 |
| 7-hr Anoxic | 4.07 | 1.50 | 5.57 |
| 8.5-hr Anoxic | 3.34 | 2.30 | 5.64 |
| 4 2-hour Anox/Aer cycles | 4.20 | 0.63 | 4.83 |

The microprocessor-based automated control system allows for the utilization of programmable logical functions using time, ORP, DO and flow rate inputs. The most basic automated program logic would enable the plant operator to input the desired number and time of start of the anoxic cycle(s).

The anoxic cycle or cycles would be terminated upon the depletion of nitrate as indicated by detection of the ORP inflection point. The operator would select the number of cycles and start times based on the site specific process performance objectives and knowledge of the diurnal loading variations for that plant.

Figure 4:
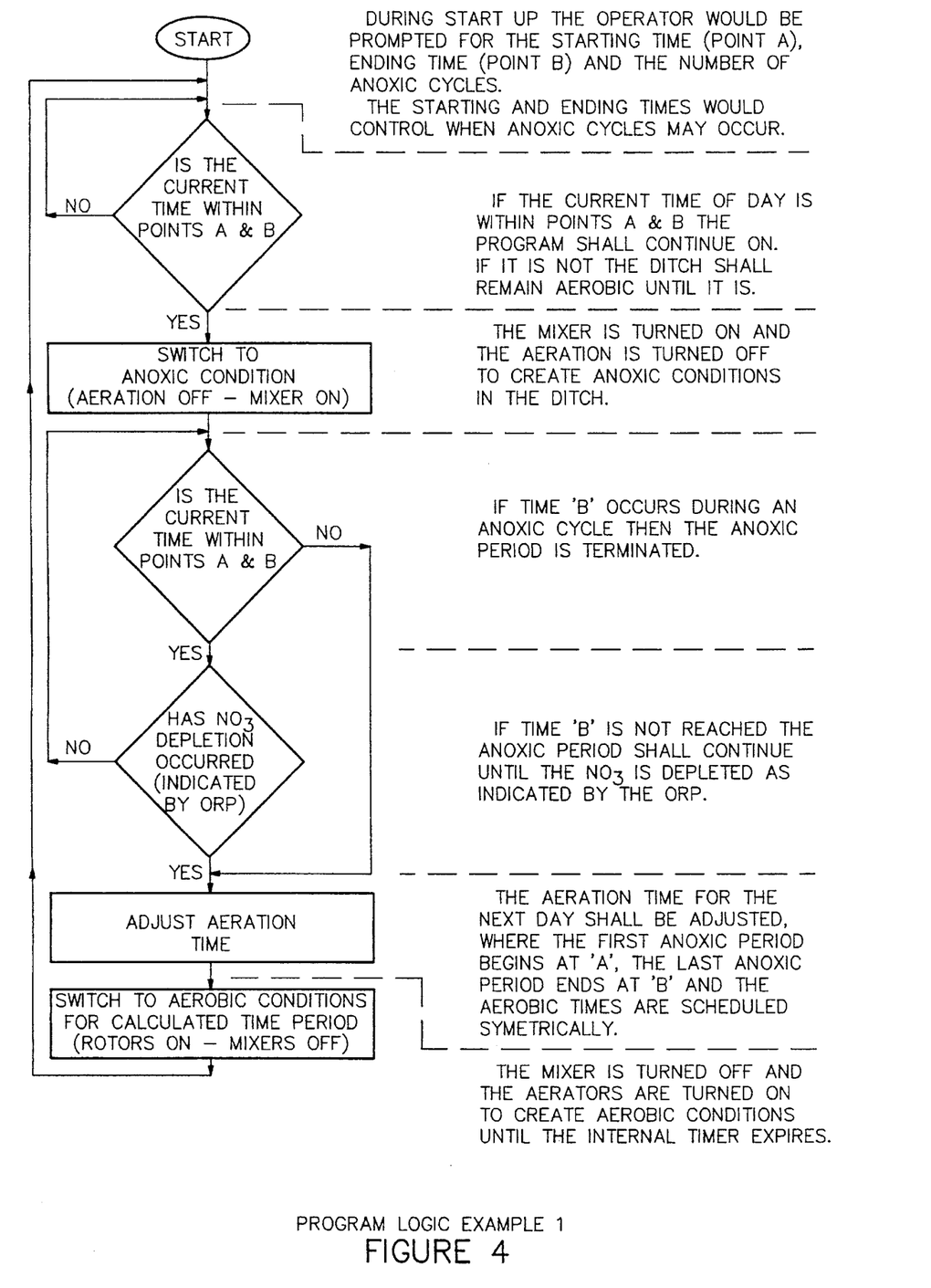
FIG. 4 is a block diagram of Example 1 of the automated program logic.

A more fully automated program logic function would require the operator to input only the number of anoxic cycles per day desired. The program logic would initiate the first anoxic cycle at Point A (refer to FIG. 3) and would terminate any anoxic cycle at Point B. The aeration periods between the selected number of anoxic cycles would be adjusted in iterative steps by the program logic until the selected anoxic cycles were scheduled systematically with the first cycle beginning at Point A and the final cycle terminating at Point B. (This would be the case only when more than one cycle was selected.) A block diagram of this automated program logic is presented in FIG. 4 as Program Logic Example 1.

Figure 5:
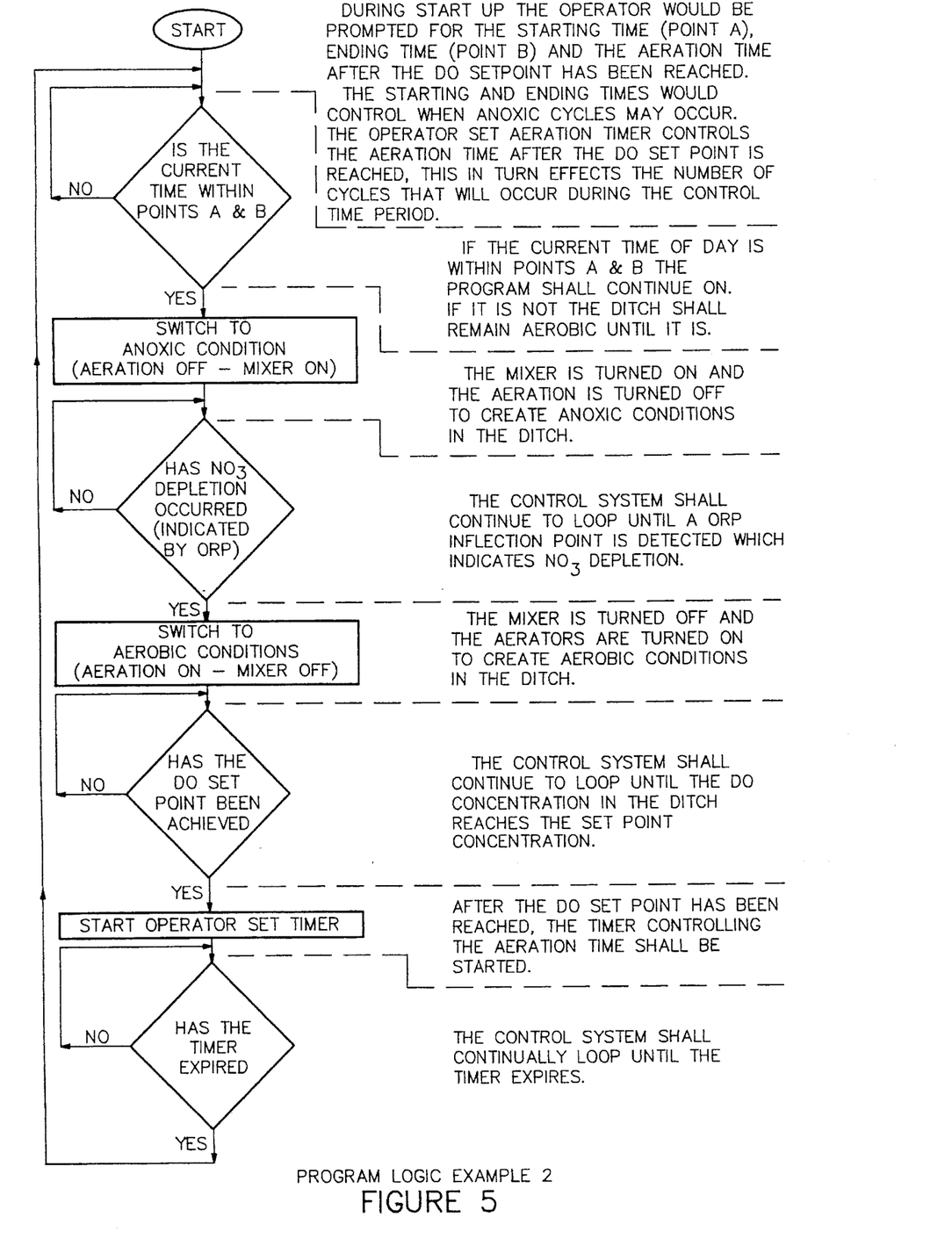
FIG. 5 is a block diagram of Example 2 of the automated program logic.

An alternative program logic function would require the operator to select only a single incremental time value. This time value would represent the length of time that an aeration cycle would continue after the DO had reached a set point (usually 1.5 mg/l or greater) following an anoxic cycle. A longer aeration time increment value will lead to fewer cycles and stronger selective pressure against filamentous bacteria. Short aeration time increments will lead to a greater number of cycles and improved total nitrogen removal. A block diagram of this automated program logic is presented in FIG. 5 as Program Logic Example 2.

Figure 6:
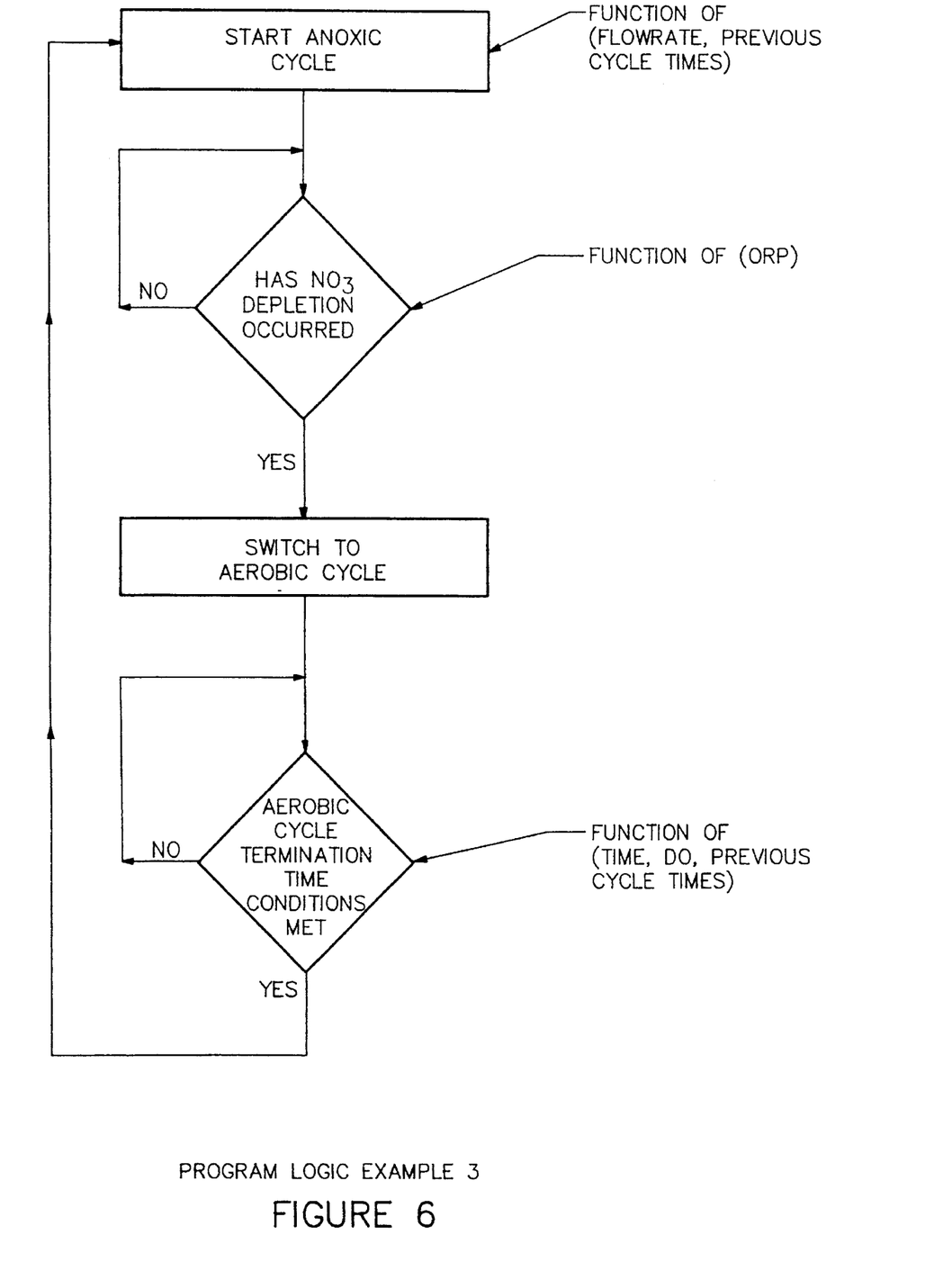
FIG. 6 is a block diagram of Example 3 of the automated program logic.

More complex program logic functions are also possible which would utilize ORP, DO and flow rate as real time variables as well as historical time and duration data stored from previous cycles to control the start times for anoxic cycles as well as the length of the subsequent cycles. The more complex program logic would generally not be necessary to achieve the desired process performance, but may be useful in plants that have unusual or highly variable diurnal loading variations. A block diagram of the more complex automatic program logic is presented in FIG. 6 as Program Logic Example 3.

While this invention is susceptible of embodiment in different forms, the drawings and the specification illustrate the preferred embodiments of the invention, with the understanding that the present disclosure is to be considered an exemplification of the principles of the invention, and the disclosure is not intended to limit the invention to the particular embodiments described.

```
------ B:/DETECT:BAS
'BASIC CODE TO FIND INFLECTION POINT = IP
'VARIABLE DESCRIPTION
   'T#(N) ARRAY TIME VALUES (MINUTES PAST MIDNIGHT)
   'P#(N) ARRAY WITH POINT VALUES (ORP)
   'LP NUMBER OF CURRENT POINTS TO BE USED
   'TP NUMBER OF TRAILING POINTS TO BE USED
   'SX# SUM OF THE TIMES
   'SY# SUM OF THE ORP
   'SXY# SUM OF THE TIME MULTIPLIED BY ORP
   'SXS# SUM OF THE TIMES SQUARES
   'S# SLOPE OF CURRENT LINE
   'TS# SLOPE OF TRAILING LINE
   'SO# INTERCEPT
   'DT# DETECTION TOLERANCE
'CALC CURRENT SLOPE
SX# = 0
SY# = 0
SXY# = 0
SXS# = 0
FOR N = 1 TO LP
SX# = SX# + T#(N)
SY# = SY# + P#(N)
SXY# = SXY# + T#(N) * P#(N)
SXS# = SXS# + T#(N) ^2
NEXT N
S# = (SXY# - SX# * SY# / LP) / (SXS# - SX# ^2 / LP)
'CALC TRAILING SLOPE
SX# = 0
SY# = 0
SXY# = 0
SXS# = 0
FOR N = LP + 1 TO (LP + TP)
SX# = SX# + T#(N)
```

```
SY# = SY# + P#(N)
SXY# = SXY# + T#(N) * P#(N)
SXS# = SXS# + T#(N) ^2
NEXT N
TS# = (SXY# − SX# * SY# / TP) / (SXS# − SX# ^ 2 / TP)
'CALC THE CHANGE IN SLOPE
DS# = TS# − S#
'COMPARE THE CHANGE IN SLOPE
'IF BOTH CURRENT AND TRAILING SLOPES ARE NEGATIVE AND THE CHANGE
'IN SLOPE IS GREATER THAN THE TOLERANCE, IP IS DETECTED.
IF DS# >= DT# and S# < 0 and TS# < 0 THEN GO TO DETECT
RETURN
DETECT
```

We claim:

1. A method of treating wastewater in an oxidation ditch having aeration means and mixing means, comprising:

(1) turning off said aeration means for a non-aeration period;

(2) using said mixing means to circulate said wastewater during said non-aeration period; and (3) ending said non-aeration period when the ORP of said wastewater has reached the ORP nitrate depletion inflection point.

2. A method of treating wastewater in an oxidation ditch having aeration means and mixing means, comprising:

(1) turning off said aeration means for a non-aeration period at the start of a period of increased BOD loading;

(2) using said mixing means to circulate said wastewater during said non-aeration period; and (3) ending said non-aeration period when the ORP of said wastewater has reached the ORP nitrate depletion inflection point.

3. The method in claim 1 or 2, wherein said ORP inflection point is detected by using the least squares linear regression method.

4. The method in claim 3, further comprising:

(1) using an automatic timer to start said non-aeration period, and (2) using an automated control system to detect said ORP inflection point and to end said non-aeration period.

5. The method in claim 2, further comprising:

(1) detecting said start of said heavy BOD loading period by monitoring the flow of said wastewater into said oxidation ditch;

(2) using an automated control system to begin said non-aeration period when said flow into said oxidation ditch indicates the start of said heavy BOD loading period;

(3) further using said automated control system to monitor the DO level of said wastewater and to detect said ORP inflection point; and (4) ending said non-aeration period when said ORP inflection point has been detected.

6. The method in claim 5, wherein there are one or more non-aeration periods per day.

* * * * *